United States Patent [19]
Kase

[11] Patent Number: 5,663,939
[45] Date of Patent: Sep. 2, 1997

[54] OPTICAL DATA RECORDING AND REPRODUCING APPARATUS INCLUDING NON-CIRCULAR BEAM SPOT

[75] Inventor: Toshiyuki Kase, Tokyo, Japan

[73] Assignee: Asahi Kogaku Kogyo Kabushiki Kaisha, Tokyo, Japan

[21] Appl. No.: 453,263

[22] Filed: May 30, 1995

[30] Foreign Application Priority Data

May 31, 1994 [JP] Japan .................................. 6-118232

[51] Int. Cl.⁶ .................................................. G11B 7/095
[52] U.S. Cl. ........................................ 369/44.23; 369/118
[58] Field of Search .............................. 369/44.23, 44.24, 369/44.14, 44.38, 13, 111, 112, 44.26, 44.32, 118, 110

[56] References Cited

U.S. PATENT DOCUMENTS

| | | | |
|---|---|---|---|
| 4,566,088 | 1/1986 | Yoshida et al. | 369/44.38 |
| 4,609,813 | 9/1986 | Cohen | 250/201.5 |
| 4,665,512 | 5/1987 | Ando | 369/44.23 |
| 4,773,053 | 9/1988 | Gottfried | 369/110 |
| 4,969,142 | 11/1990 | Nagashima et al. | 369/109 |
| 5,093,822 | 3/1992 | Kugiya et al. | 369/121 |
| 5,142,520 | 8/1992 | Yanagi et al. | 369/44.32 X |
| 5,343,332 | 8/1994 | Oono et al. | 359/837 |
| 5,351,225 | 9/1994 | Ishida et al. | 369/44.38 X |

*Primary Examiner*—Thang V. Tran
*Attorney, Agent, or Firm*—Greenblum & Bernstein P.L.C.

[57] ABSTRACT

An optical data recording and reproducing apparatus in which a beam spot is made incident upon recording tracks of an optical recording medium, so that the beam reflected from the optical recording medium is detected to obtain a data signal and a tracking error signal. The optical recording medium is a rotatable optical disc having a signal recording surface. The recording tracks include concentrically arranged recording track sectors formed on the signal recording surface of the optical disc and preformat portions provided between the adjacent recording track sectors. A beam shape setting device is provided to shape an image of the beam spot formed on the track sectors into a non-circular shape which is elongated in the circumferential direction of the optical disc.

20 Claims, 8 Drawing Sheets

OPTICAL DATA RECORDING AND REPRODUCING APPARATUS INCLUDING NON-CIRCULAR BEAM SPOT

BACKGROUND OF THE INVENTION

1. Field of the Invention

The present invention relates to an apparatus for recording optical data onto a recording medium and reproducing data recorded on a recording medium therefrom, and more particularly, it relates to an optical data recording and reproducing apparatus using an optically recording disc on which high density data can be recorded.

2. Description of Related Art

In general, in conventional optical data recording and reproducing apparatuses, an optical disc having a storage capacity of approximately 650 M-bytes is used. In an effort to increase the recording density of data, development has begun on optical discs having a storage capacity of approximately 1.3 G-bytes. Such an optical disc having a high recording density of approximately 1.3 G-bytes is used in an optical data recording and reproducing apparatus which operates based on a different recording principle than that of an optical data recording and reproducing apparatus for an optical disc having a memory capacity of approximately 650 M-bytes. Specifically, in an optical data recording and reproducing apparatus for an optical disc having a high storage density, a writing frequency signal is varied in accordance with the movement of a beam spot incident upon a data recording surface of the optical disc from the outer peripheral portion to the inner peripheral portion of the optical disc to thereby maintain the writing linear velocity substantially constant in the inner and outer peripheral portions of the optical disc. Specifically, assuming that the recording optical disc rotates at a constant speed, the peripheral speed increases toward the outer periphery thereof, and accordingly, the writing frequency is increased toward the outer periphery of the recording disc. Therefore, the recording linear density is kept substantially constant.

As shown in FIG. 8, which schematically shows the basic concept of a conventional high density optical disc 24, preformat portions P are formed on signal recording surfaces 24a of recording tracks to represent the number of the associated track sector T. However, in the high density recording disc, the preformat portions P are not aligned in the radial direction of the disc 24. Upon recording or reproducing data, there is a possibility that the signal leaks from the preformat portion P formed in the adjacent track sector T. The leakage occurs for example when a beam spot B is made incident upon micro-projections 40 which are produced in the preformat portions P during the manufacturing process. This results in an occurrence of a signal error. As shown in FIG. 8, normal signal depressions 39 are formed in the preformat portions P.

In theory, the above-mentioned problem can be solved by reducing the diameter of the circular beam spot, thereby the beam spot is not made incident upon the projection 40 in the adjacent track sector T. However, in practice, the beam spot diameter is already minimized, and accordingly, it is extremely difficult to further reduce the beam spot diameter.

SUMMARY OF THE INVENTION

It is an object of the present invention to provide an optical data recording and reproducing apparatus in which a beam spot incident on one track sector does not enter an adjacent track sector to enhance the reliability of data signal.

To achieve the object mentioned above, according to the present invention, there is provided an optical data recording and reproducing apparatus in which a beam spot is incident upon recording tracks of an optical recording medium, so that the beam reflected from the optical recording medium is detected to obtain data signal and track error signal. The optical recording medium is a rotatable optical disc having a signal recording surface on which the beam spot is made incident, including concentrically arranged recording track sectors formed on the signal recording surface of the optical disc and preformat portions provided between the adjacent recording track sectors. A provision is made for a beam shaping device which is used to shape an image of the beam spot formed on the track sectors into a non-circular shape which is elongated in the circumferential direction of the optical disc.

Preferably, the beam shaping device comprises an astigmatism producing element for intentionally producing an astigmatism. For instance, the astigmatism producing element comprises a birefringent element or an optical element having an astigmatism, provided in the optical path of the beam, or an anamorphic optical system provided in the optical path of the beam.

In an embodiment, the beam shaping means comprises a coma producing device for intentionally producing a coma.

Preferably, provision is made for an objective lens which converges the beam onto the signal recording surface. The coma producing device comprises a movable mirror which varies the incident angle of the beam with respect to the objective lens, or a movable adjusting member which inclines the objective lens with respect to the optical disc.

The present disclosure relates to subject matter contained in Japanese patent application No. 06-118232 (filed on May 31, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 2:
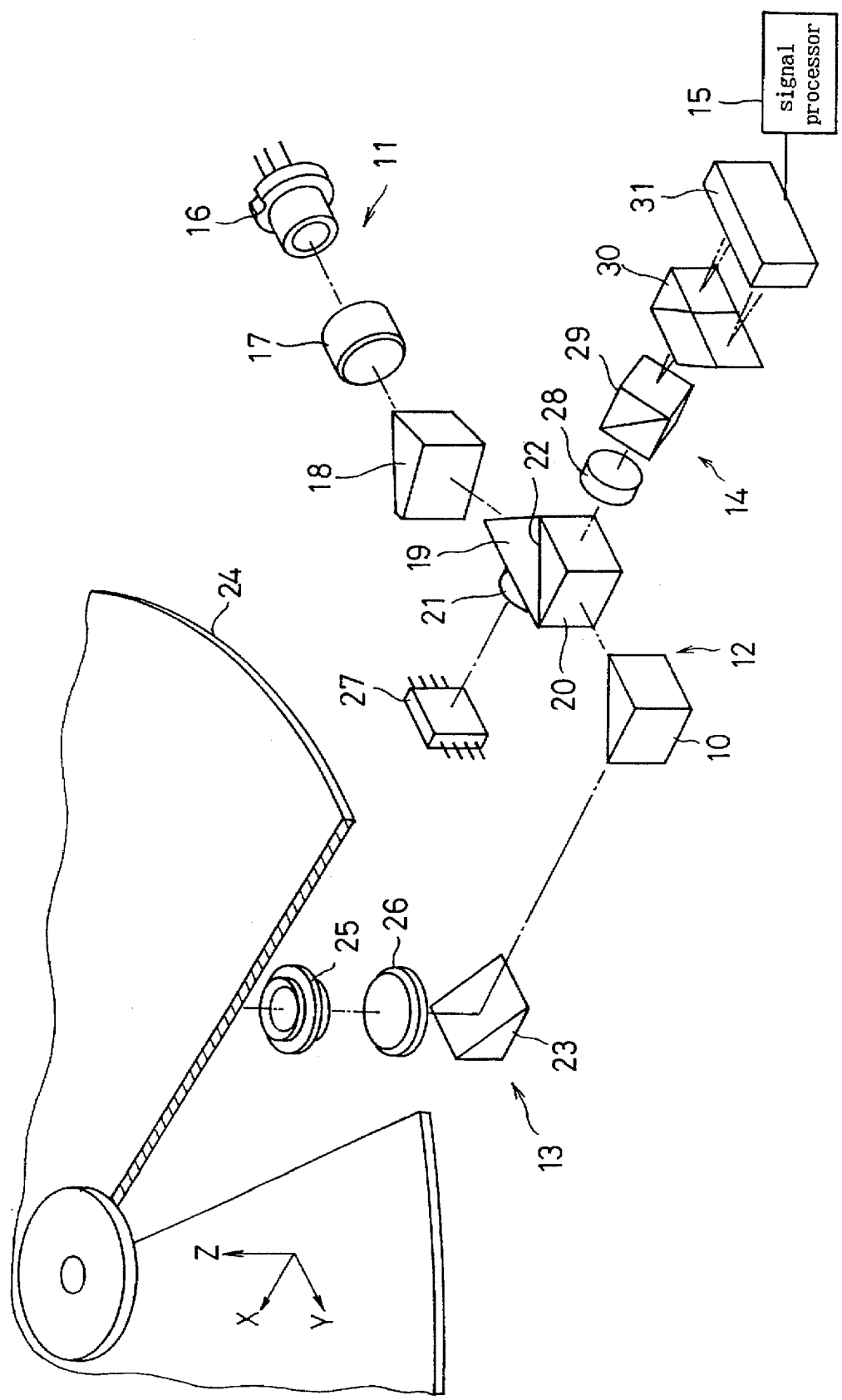
FIG. 2 is a perspective view of the main components of an optical data recording and reproducing apparatus shown in FIG. 1.

FIG. 2 shows an optical data recording and reproducing apparatus according to the present invention. The optical data recording and reproducing apparatus comprises a light source portion 11, a prism block 12, an objective optical system 13, a signal detecting portion 14, and a signal processor 15.

The light source portion 11 is comprised of a semiconductor laser 16, a collimating lens 17 which collimates divergent light emitted from the semiconductor laser 16 into a parallel beam, and an anamorphic prism 18 which shapes a bundle of light collimated by the collimating lens 17.

The prism block 12 comprises an anamorphic prism 19 which shapes the beam transmitted through the anamorphic prism 18 into a circular section, a condenser lens 21 and a right-angle prism 20, both being connected to the anamorphic prism 19, and a mirror prism 10. The connecting surface between the anamorphic prism 19 and the right-angle prism 20 define a half-mirror surface 22. The collimating lens 17 and the anamorphic prisms 18 and 19 constitute an anamorphic optical system.

The beam emitted from the light source portion 11 is partially reflected by the half mirror surface 22 and condensed by the condenser lens 21 onto the light receiving element 27. Additionally, the beam from the light source portion 11 is partially transmitted through the half mirror surface 22 and made incident upon the objective optical system 13 through the mirror prism 10. The light receiving elements 27 convert the light into electrical signals which are used to automatically control the output power of the semiconductor laser 16.

The objective optical system 13 comprises an erecting mirror prism 23 which reflects the beam transmitted through the mirror prism 10 toward the optical recording disc 24, and an objective lens 25 which converges the beam from the erecting mirror prism 23 onto the optical disc 24. An anamorphic astigmatism element 26 which has a birefringence or an astigmatism is provided between the objective lens 25 and the erecting mirror prism 23. The objective lens 25, the astigmatism element 26, and the erecting mirror prism 23 are provided in a head (not shown) which is moved in the radial direction X of the optical disc 24. The objective lens 25 and the astigmatism element 26 are provided on an actuator (not shown) within the head and are moved in the optical axis direction Z and in the radial direction X of the optical disc 24.

The astigmatism element 26 converges the beam reflected by the erecting mirror prism 23 onto different points on the principal ray as a bundle of light within a meridional plane including the principal ray and the optical axis, and as a bundle of light within a sagittal plane perpendicular to the meridional plane and including the principal ray.

The beam converged onto the signal recording surface 24a (see FIG. 1) of the optical disc 24 by the objective lens 25 and reflected by the signal recording surface 24a is transmitted through the objective lens 25 and the astigmatism element 26. The beam is then reflected by the erecting mirror prism 23 and the mirror prism 10 and subsequently reflected by the half mirror surface 22 of the right-angle prism 20 to be made incident upon the signal detecting portion 14.

The signal detecting portion 14 is comprised of a condenser lens 28 which converges the beam from the prism block 12, a Wollaston prism 29, a polarizing beam splitter prism, hereinafter referred to as a PBS prism 30, and a composite sensor 31. The Wollaston prism 29 is made of a crystalline polarizer which splits the beam from the condenser lens 28 into beams having different polarization directions. The split beams are emitted to the composite sensor 31 through the PBS prism 30.

The signal processor 15 which has an adder (not shown) and subtractor (not shown), receives a data signal and generates, for example, a focus error signal, a tracking error signal, depending on the quantity of light received by the light receiving elements and in accordance with the output of the light receiving elements of the composite sensor 31 controls the driving of the objective lens 25.

The optical data recording and reproducing apparatus as constructed above operates as follows.

When the divergent beam is emitted by the operation of the semiconductor laser 16, the divergent beam is collimated by the collimating lens 17. The beam is then shaped into a circular cross section by the anamorphic prism 19 after being initially shaped by the anamorphic prism 18. Thereafter the beam is split into a beam directed to the light receiving element 27 and another beam directed to the prism block 12. The beam directed to the prism block 12 is made incident upon the objective lens 25 through the mirror prism 10, the erecting mirror prism 23 and the astigmatism element 26, and is converged onto the signal recording surface 24a of the optical disc 24 by the objective lens 25.

Figure 1:
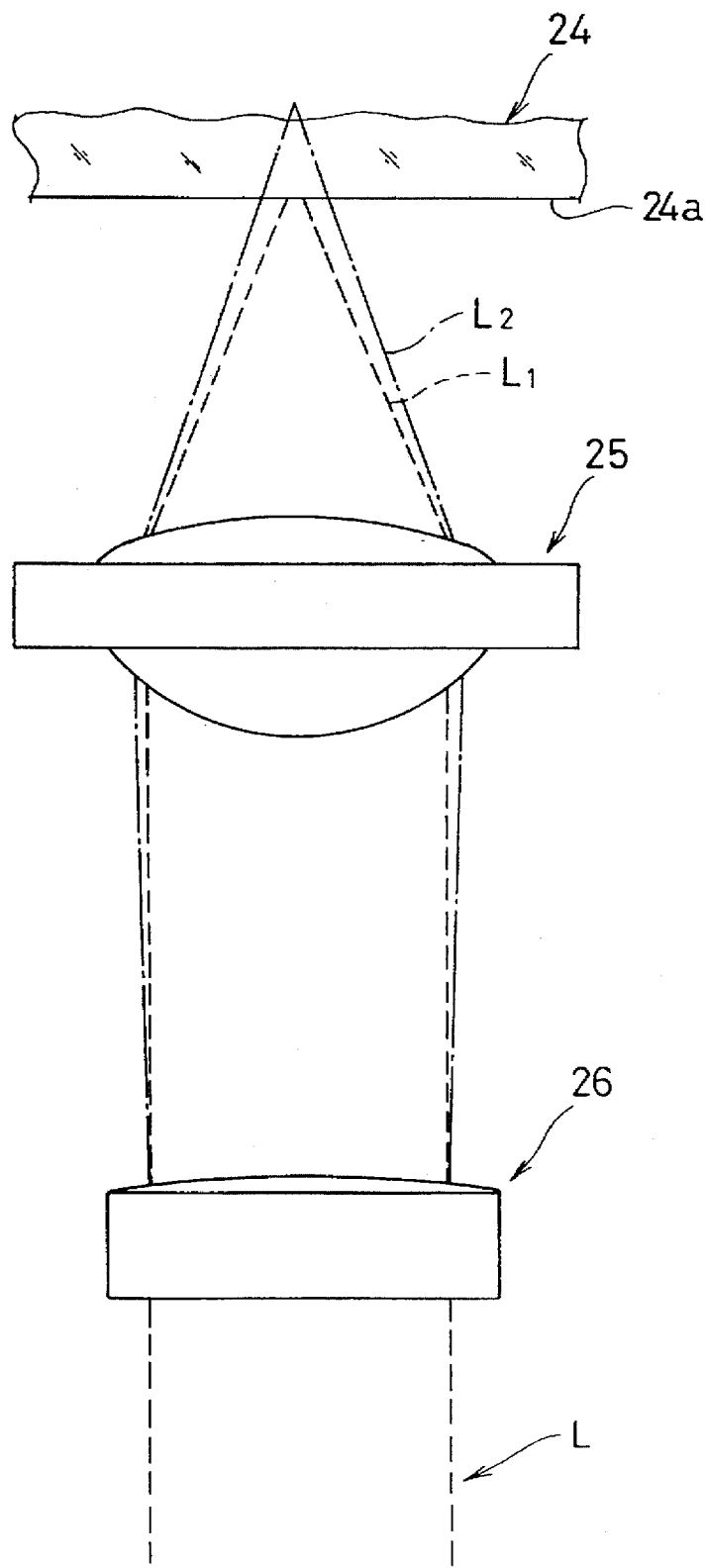
FIG. 1 is a conceptual view of the main components of an optical data recording and reproducing apparatus according to a first embodiment of the present invention.
Figure 3:
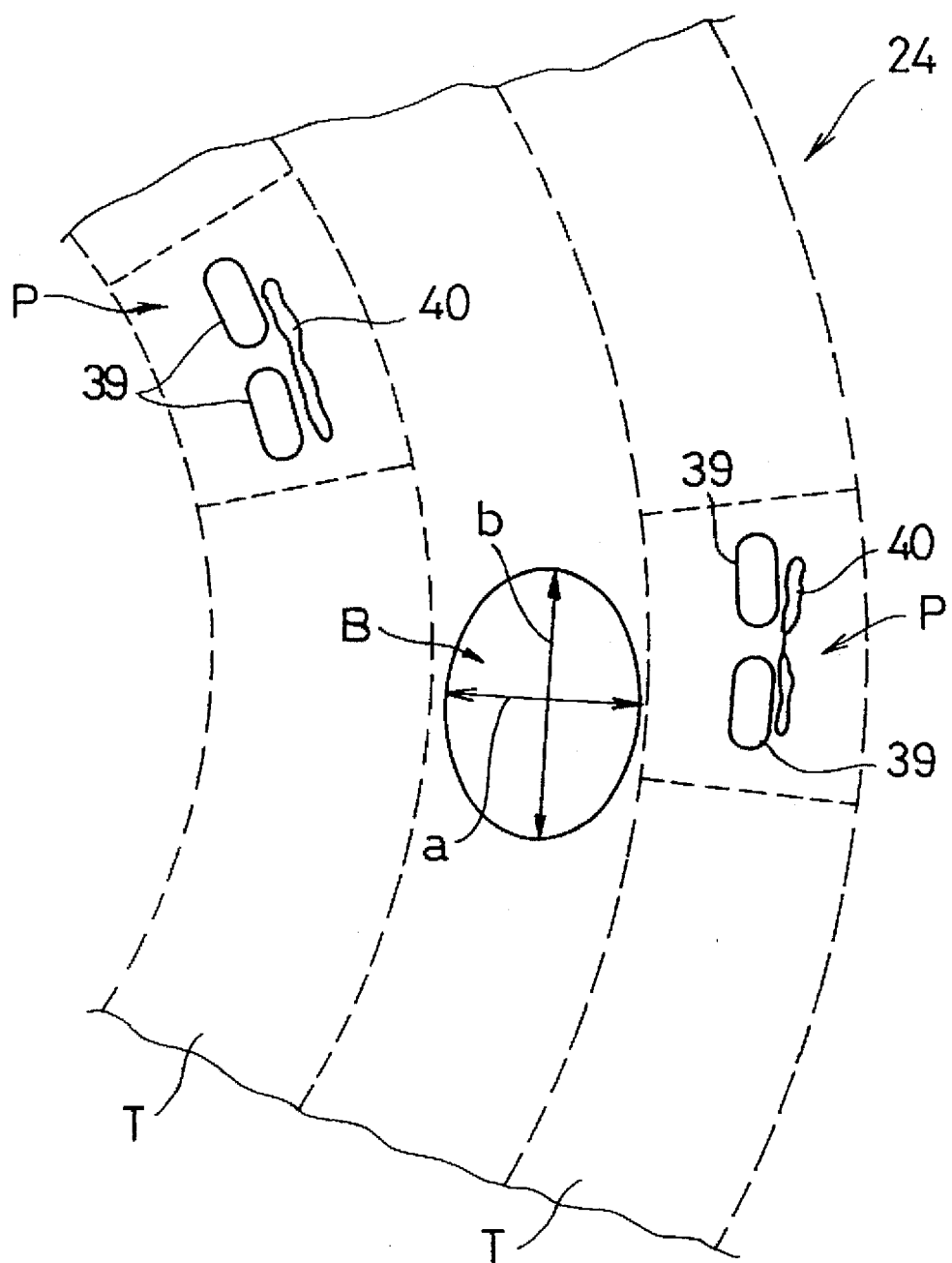
FIG. 3 is an explanatory view of a signal recording surface on which a beam spot is formed, in an optical data recording and reproducing apparatus shown in FIG. 1.

As shown in FIG. 1, the astigmatism element 26 splits the beam L reflected by the erecting mirror prism 23 into two beams to be converged onto different points. The split beams are a bundle of meridional rays $L_1$ and a bundle of sagittal rays $L_2$. The meridional rays $L_1$ are converged at a point in front of the converging point of the sagittal rays $L_2$. Consequently, if the objective lens 25 and the astigmatism element 26 are positioned in such a manner that the sagittal rays $L_2$ are appropriately converged on each track sector T of the signal recording surface 24a, the meridional rays $L_1$ can be converged as an elliptical beam spot B onto the signal recording surface 24a by the control of the processor 15, as shown in FIG. 3.

Specifically, the beam spot B formed on the track sector T has a non-circular (e.g., elliptical) shape having a beam diameter "a" in the radial direction of the optical disc 24, smaller than the beam diameter "b" in the circumferential direction so as not to detect the inner projections 40 in any track sectors T. As the track sectors are moved in the circumferential direction during the rotation of the optical disc 24, the projections 40 located on the inner peripheral side are not detected because of the non-circular shape of the beam spot B of the meridional rays $L_1$. Therefore, no disturbance of data signals occurs. Consequently, the data signals can be always correctly read from the track sectors T.

In the first embodiment mentioned above, the astigmatism element 26 is used to intentionally produce an astigmatism in the beams incident upon the optical disc 24. Alternatively, it is possible to produce an astigmatism by another means without relying upon the astigmatism element 26.

Figure 4:
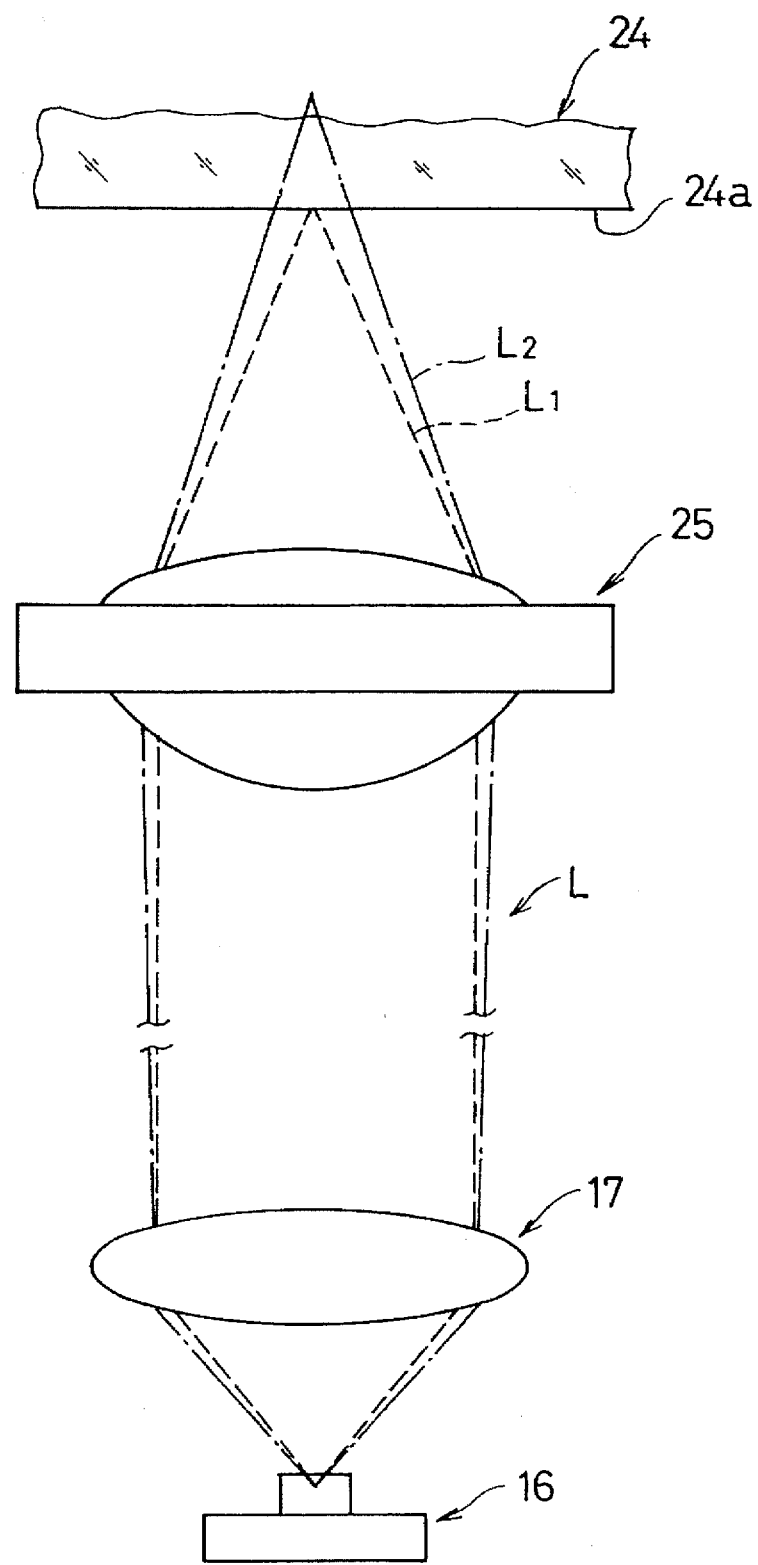
FIG. 4 is a conceptual view of the main components of an optical data recording and reproducing apparatus according to a second embodiment of the present invention.

Specifically, in the second embodiment of the present invention illustrated in FIG. 4, an astigmatism is intentionally produced by employing an astigmatic difference in the light beam emitted by the semiconductor laser 16, depending on the position of a collimating lens 17 provided in light source portion 11. In this alternative in which the collimating lens 17 whose position is adjusted constitutes an astigmatism producing means, no additional optical element is necessary to produce the astigmatism. Therefore, the apparatus can be simplified because there are fewer components.

Figure 5:
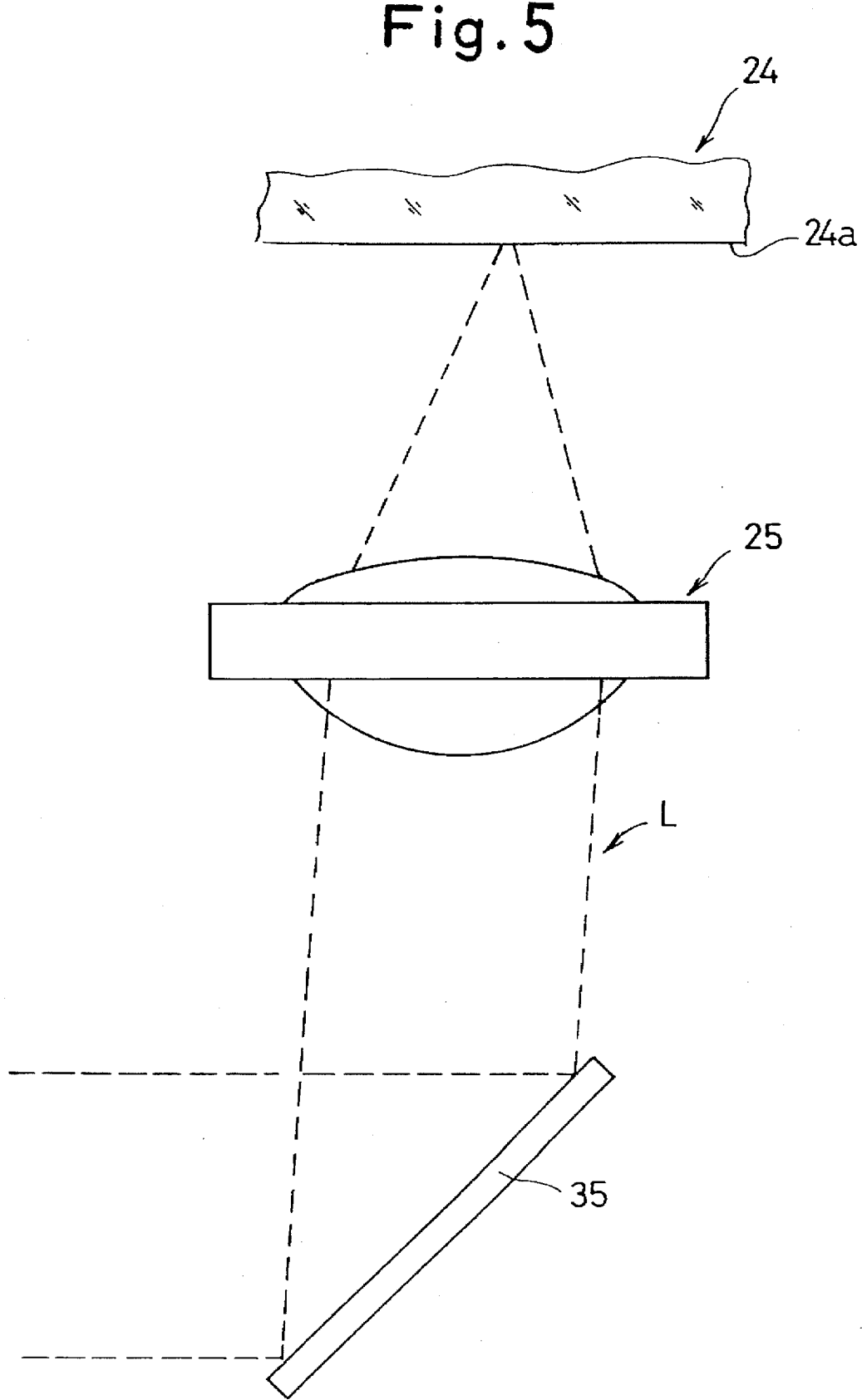
FIG. 5 is a conceptual view of the main components of an optical data recording and reproducing apparatus according to a third embodiment of the present invention.

FIG. 5 shows a third embodiment of the present invention in which a coma, or asymmetrical image producing means, is used as a beam shape setting means to intentionally produce a coma. In the third embodiment, the coma producing means includes a movable mirror 35 with which the erecting mirror prism 23 of the objective optical system in the previous embodiments is replaced. The position and angle of the movable mirror 35 is adjusted to slightly deviate the convergent point of the beam L on the signal recording surface 24a from the optical axis of the objective lens 25 in the tangential direction of the optical disc 24.

Figure 6:
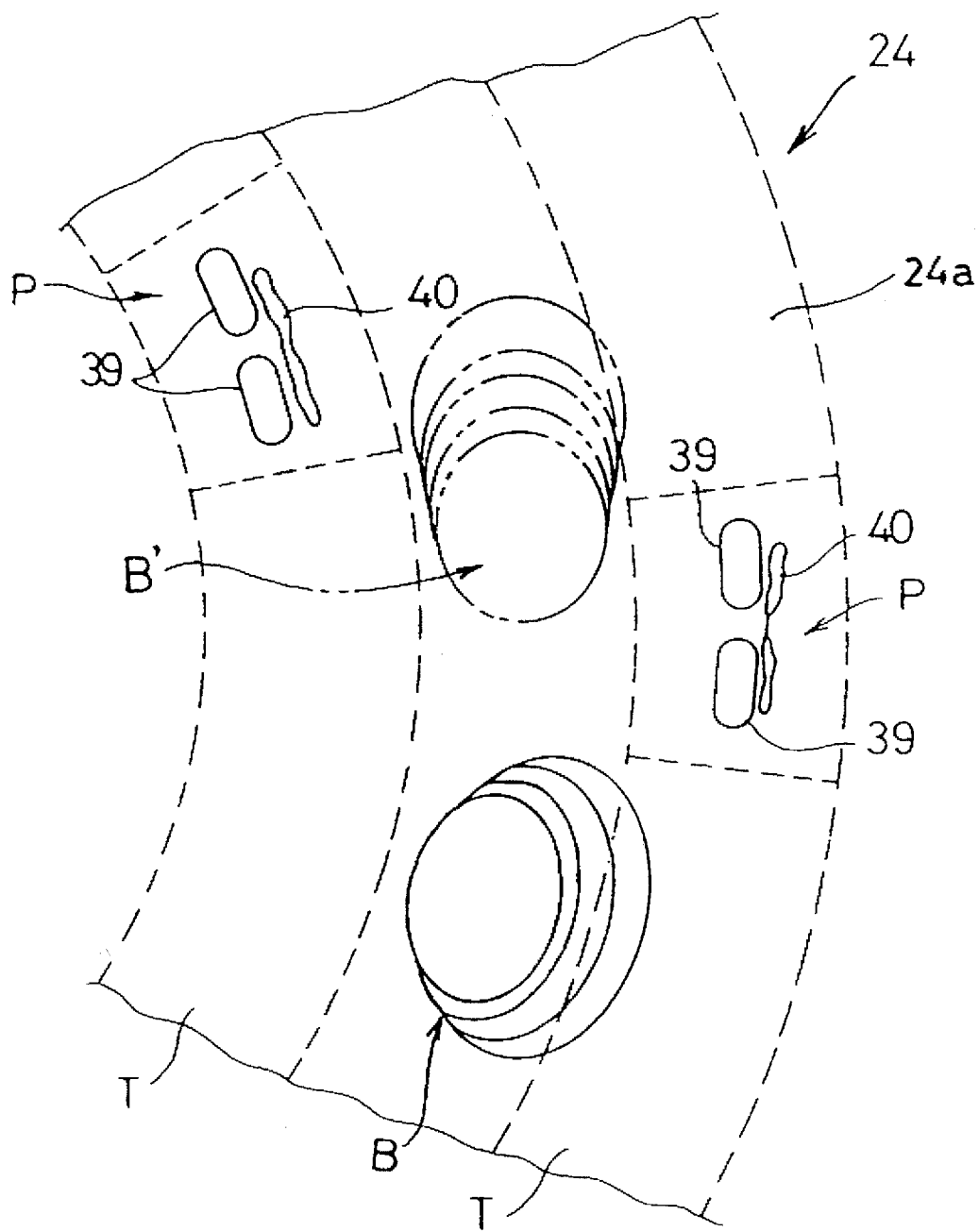
FIG. 6 is an explanatory view of a signal recording surface on which a beam spot is formed, in an optical data recording and reproducing apparatus shown in FIG. 5.

Thus, the incident angle of the beam L transmitted through the mirror prism 10 with respect to the objective lens 25 is varied to intentionally produce a coma by an adjustment of the position and angle of the movable mirror 35. As shown in FIG. 6, the shape of the image (beam spot B) formed on the track sector T is non-circular, wherein the direction of the coma is predetermined such that no beam spot B is made incident upon the projections 40. As the track sectors are moved in the circumferential direction during the rotation of the optical disc 24, the projections 40 located on the inner peripheral side are not detected by the non-circular beam spot B. Therefore, there is no disturbance of data signals. Consequently, the data signals can be always correctly read from the track sectors T.

Figure 7:
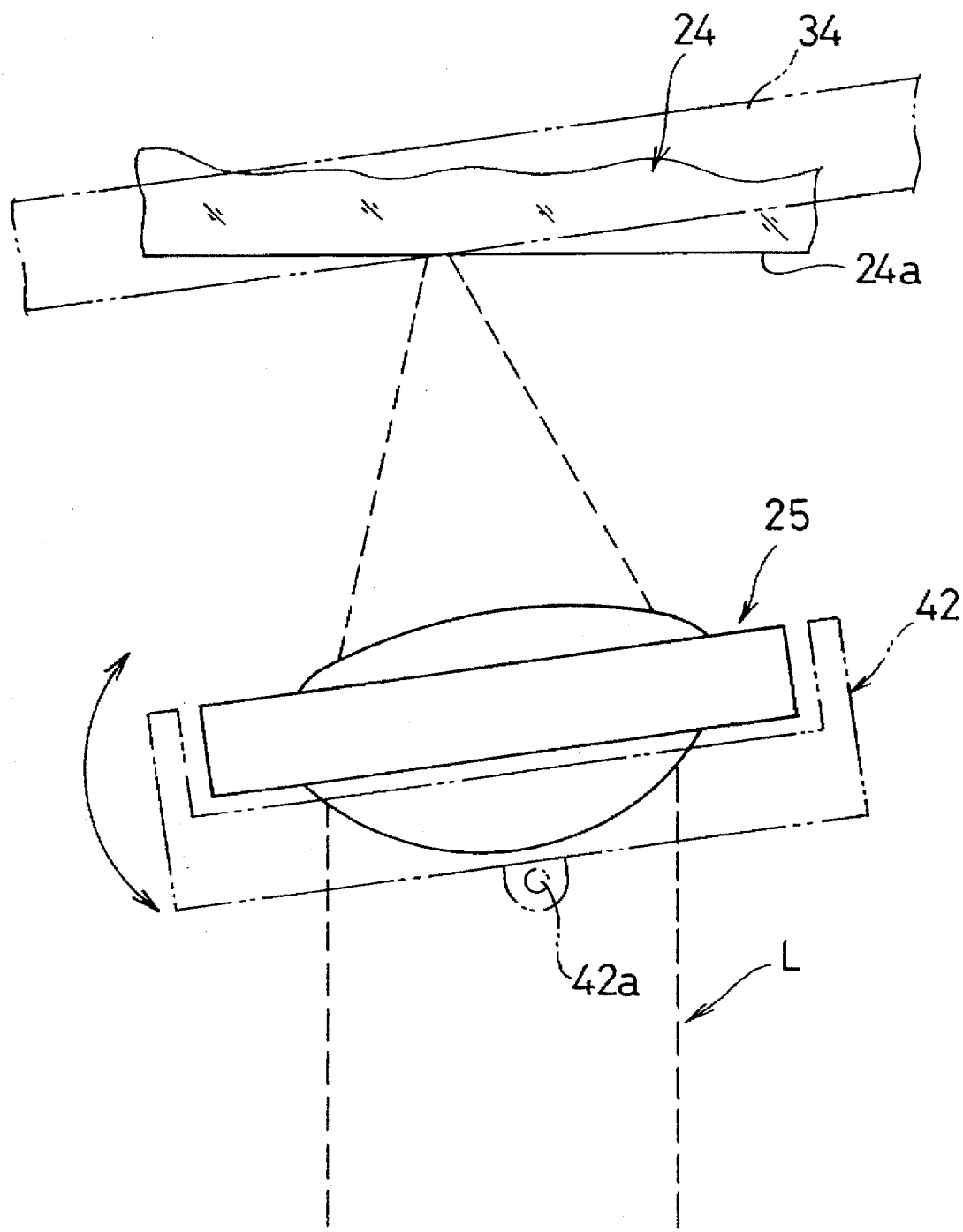
FIG. 7 is a conceptual view of the main components of an optical data recording and reproducing apparatus according to a fourth embodiment of the present invention; and, FIG. 8 is an explanatory view of a detection of projections formed in preformat portions, using a beam spot.
Figure 8:
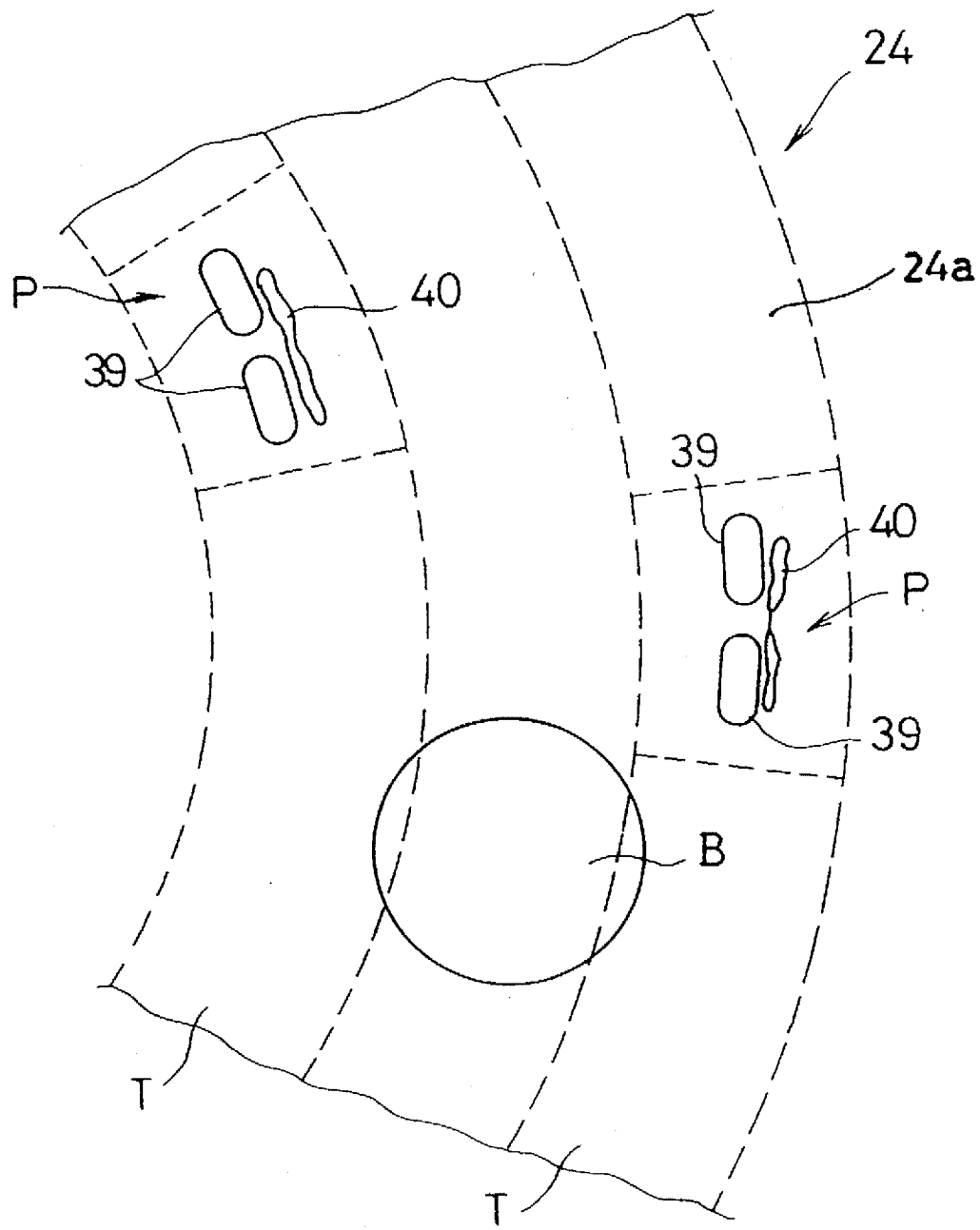

Although the coma is intentionally produced by the adjustment of the position and inclination angle of the movable mirror 35 in the third embodiment, it is possible to produce a coma by a member other than the movable mirror 35, as shown in FIG. 7 which shows a fourth embodiment of the present invention. In the fourth embodiment, a movable adjusting member 42 which adjustably or tiltably supports the objective lens 25 is provided in the optical path of the objective optical system 13. The movable adjuster 42 is rotatable about a pivot shaft 42a to deviate the convergent point of the beams (beam spot B) converged by the objective lens 25 from the optical axis of the objective optical system 13. The moveable adjuster 42 and pivot shaft 42a serve to move the beam spot B in the tangential direction of the optical disc 24.

To operate the movable adjuster 42 first, a glass cover 34 corresponding to the optical disc 24 is slightly inclined as the movable adjuster 42 is rotated as shown in FIG. 7. Thereafter, the movable adjuster 42, and accordingly, the objective lens 25 are slightly rotated and fixed at a position in which the shape of the beam spot B formed on the rear surface of the glass cover 34 is circular. Afterwards, the glass cover 34 is removed and the optical disc 24 is set to a correct position in the place of the removed glass cover 34, producing a coma thereon. Consequently, the shape of an image of the beams L transmitted through the mirror prism 10 on the signal recording surface 24a changes. Specifically, the shape of the beam spot forming the coma on the track sector T is non-circular, for example, as shown in FIG. 6.

It should be noted that in the third and fourth embodiments, the shape of the beam spot B is set as indicated by a solid line in FIG. 6, by the movable mirror 35 or the movable adjuster 42. The shape of the beam spot is not limited thereto and can be selected from, for example, those indicated by two-dotted and dashed lines B' in FIG. 6, by the adjustment of the adjustable mirror 35 or the movable adjusting member 42.

As can be understood from the above discussion, according to the present invention, provision is made for a beam shape setting means for producing a non-circular beam spot formed on the track sectors, and hence, there are no or little signals detected, which would be otherwise detected from the adjacent track sector, thus resulting in an increased reliability of data signals.

I claim:

1. An optical data recording and reproducing apparatus comprising:

a rotatable optical disk having a signal recording surface upon which a beam spot is incident;

an objective lens which converges a beam for data reproduction onto said signal recording surface;

recording track sectors concentrically arranged on said signal recording surface of said optical disk and preformat portions provided between adjacent recording track sectors; and means for shaping said beam spot formed on said track sectors into a non-circular shape which is elongated in the circumferential direction of said optical disk, said shaping means being distinct from said objective lens.

2. An optical data recording and reproducing apparatus according to claim 1, wherein said beam shaping means comprises an astigmatism producing means for producing an astigmatism.

3. An optical data recording and reproducing apparatus according to claim 2, wherein said astigmatism producing means comprises a birefringent element or an optical element having an astigmatism, provided in the optical path of a beam formed into said beam spot.

4. An optical data recording and reproducing apparatus according to claim 2, wherein said astigmatism producing means comprises an anamorphic optical system provided in the optical path of a beam formed into said beam spot.

5. An optical data recording and reproducing apparatus according to claim 1, wherein said beam shaping means comprises a coma producing means for producing a coma.

6. An optical data recording and reproducing apparatus according to claim 5, wherein said coma producing means comprises a movable mirror which varies an incident angle of the beam with respect to said objective lens.

7. An optical data recording and reproducing apparatus according to claim 5, wherein said coma producing means comprises a movable adjusting member which inclines said objective lens with respect to said optical disc.

8. An optical data recording and reproducing apparatus according to claim 1, wherein said preformat sectors are not aligned in a radial direction of said rotatable recording disc.

9. An optical data recording and reproducing apparatus wherein a beam spot is made incident upon recording tracks of a rotatable optical disc, so that a beam reflected from said optical disc is detected to obtain a data signal and a tracking error signal, said apparatus comprising:

recording tracks including concentrically arranged recording track sectors formed on a signal recording surface of said optical disc and preformat portions provided between adjacent recording track sectors; and a beam shape setting means for shaping said beam spot for data reproduction formed on said track sectors into a non-circular shape which is elongated in the circumferential direction of said optical disc.

10. The optical data recording and reproducing apparatus according to claim 2, further comprising a semiconductor laser for emitting a light beam, a collimating lens and an anamorphic prism for making a cross section of said beam circular, wherein said astigmatism producing means is positioned along a light path between said anamorphic prism and said rotatable optical disk.

11. An optical data recording and reproducing apparatus comprising:

a rotatable optical disk having a signal recording surface upon which a beam spot is incident;

an objective lens which converges a beam onto said signal recording surface;

recording track sectors concentrically arranged on said signal recording surface of said optical disk and preformat portions provided between adjacent recording track sectors; and means for shaping said beam spot formed on said recording track sectors into a non-circular shape which is elongated in the circumferential direction of said optical disk, said beam shaping means comprising a coma producing means for producing a coma, said coma producing means comprising a movable adjusting member which inclines said objective lens with respect to said optical disk.

12. The optical data recording and reproducing apparatus according to claim 11, wherein said preformat sectors are not aligned in a radial direction of said rotatable optical disc.

13. The optical data recording and reproducing apparatus according to claim 9, said beam shape setting means comprising an astigmatism producing means for producing an astigmatism.

14. The optical data recording and reproducing apparatus according to claim 13, said astigmatism producing means comprising one of a birefringent element and an optical element having an astigmatism positioned in the optical path of a beam forming said beam spot.

15. The optical data recording and reproducing apparatus according to claim 13, said astigmatism producing means comprising an anamorphic optical system positioned in the optical path of a beam forming said beam spot.

16. The optical data recording and reproducing apparatus according to claim 9, said beam shape setting means comprising a coma producing means for producing a coma.

17. The optical data recording and reproducing apparatus according to claim 16, further comprising an objective lens for converging a beam onto said rotatable optical disk, said coma producing means comprising a movable mirror which varies an incident angle of the beam with respect to said objective lens.

18. The optical data recording and reproducing apparatus according to claim 16, further comprising an objective lens which converges a beam onto said rotatable optical disk, said coma producing means comprising a movable adjusting member which inclines said objective lens with respect to said rotatable optical disk.

19. The optical data recording and reproducing apparatus according to claim 9, wherein said preformat portions are not aligned in a radial direction of said rotatable optical disk.

20. The optical data recording and reproducing apparatus according to claim 9, further comprising an objective lens for converging a beam onto said rotatable optical disk, said objective lens being distinct from said beam shape setting means.

* * * * *